United States Patent
Ono

[11] Patent Number: 5,966,413
[45] Date of Patent: Oct. 12, 1999

[54] DIGITAL DEMODULATOR AND METHOD OF OPERATION

[75] Inventor: Shigeru Ono, Tokyo, Japan

[73] Assignee: NEC Corporation, Japan

[21] Appl. No.: 08/895,730

[22] Filed: Jul. 17, 1997

[30] Foreign Application Priority Data

Jul. 17, 1996 [JP] Japan ..................................... 8-187537

[51] Int. Cl.[6] .............................. H04L 23/02; H04L 5/12
[52] U.S. Cl. ........................... 375/341; 714/795; 375/262
[58] Field of Search .................................. 371/43.1, 43.6, 371/43.7, 43.8; 375/262, 326, 341, 354, 359; 364/728.01; 714/786, 794, 795, 796

[56] References Cited

U.S. PATENT DOCUMENTS

| 4,802,174 | 1/1989 | Hiraiwa et al. .......................... 371/46 |
| 4,807,230 | 2/1989 | Srinivasagopalan et al. ............ 371/46 |
| 5,757,834 | 5/1998 | Fang et al. ................................. 371/46 |

*Primary Examiner*—Chi H. Pham
*Assistant Examiner*—Jean B. Corrielus
*Attorney, Agent, or Firm*—Ostrolenk, Faber, Gerb & Soffen, LLP

[57] ABSTRACT

A demodulator performs both synchronization and decoding concurrently by decoding a received preambleless signal according to Viterbi-decoding scheme and determining a time alignment function n(t) which indicates where the decoded sequence is located in a time period of the received signal. After converting the received preambleless signal to a received sequence in a sampling rate which is at least the predetermined symbol rate, a Viterbi decoder is synchronized with the received sequence while determining the time alignment function n(t) so that the Viterbi-decoded sequence is closest to the received sequence.

15 Claims, 3 Drawing Sheets

DIGITAL DEMODULATOR AND METHOD OF OPERATION

BACKGROUND OF THE INVENTION

1. Field of the invention

The present invention generally relates to a digital demodulation technique in a wireless communication system.

2. Description of the Related Art

In a digital demodulator, coherent detection or differential detection is performed before bit synchronization and then symbol decision is performed using a detected baseband signal at bit-synchronized sampling points. However, according to such a demodulation method, the carrier recovery and symbol synchronization performance have a great effect on the receiving characteristic.

It is also known that the demodulation performance is improved by receiving a predetermined training signal or a preamble signal. More specifically, the predetermined training signal is used to calculate a decision error. The decision error is fed back to an equalizer and a phase-locked loop to compensate for distortions including linear distortion and group delay distortion.

In the case of mobile communications, however, since radio channel characteristics frequently vary, it is necessary to transmit the training signal for each burst transmission to compensate for variations in radio propagation characteristic. Therefore, the overhead becomes larger and thereby the throughput of the communications system is reduced. Contrarily, as the training bit length becomes shorter, the amount of transmission data is increased but the synchronization error is also increased. Similarly, in packet communications, the shorter the sync-bit length in a packet, the larger the symbol synchronization error.

SUMMARY OF THE INVENTION

An object of the present invention is to provide a demodulation method and apparatus which can achieve precise demodulation based on a preambleless signal.

Another object of the present invention is to provide a demodulation method and apparatus which can perform both synchronization and demodulation in a preambleless communications system.

According to the present invention, both synchronization and decoding are concurrently performed by decoding a received signal according to Viterbi decoding scheme and determining a time alignment function or a time mapping n(t) which indicates where the decoded sequence is located in a time period of the received signal.

According to an aspect of the present invention, in a method for demodulating a received preambleless signal which does not include a signal for synchronization but is encoded by a convolutional code, after converting the received preambleless signal to a received sequence in a sampling rate which is at least a predetermined symbol rate, a Viterbi decoder is synchronized with the received sequence to produce an output sequence while determining the alignment function n(t) so that a Viterbi-decoded sequence is closest to the received sequence.

More specifically, a received preambleless signal may be sampled and converted to a digital signal in a sampling rate which is M (M≧1) times the predetermined symbol rate. The digital signal is represented by $x_t$ (t=1, 2, ..., T), where t is a sampling index corresponding to a sampling time instant and T is the number of sampling points during a time period of the received preambleless signal. On the other hand, an encoded signal f(w, n(t)) is generated from a data sequence w, where n(t)=1, 2, ..., $N_w$ ($N_w$ is a length of transmitted sequence).

In this case, a cumulative error or distance D(w) may be represented by the following equation:

$$D(w) = \sum_{t=1}^{T} \|x_t - f(w, n(t))\|^2. \quad (1)$$

Therefore, an operation of the present invention is to obtain the data sequence w and the alignment function n(t) so that the cumulative distance D(w) is minimized. In other words, this is a minimization problem of the cumulative distance D(w). Therefore, the dynamic programming represented by the following equations (2)–(4) can be used to solve such a problem.

$$d_w(t, n, j) = \| f_t(n, j) - x_t \|^2 \quad (2)$$

$$g_w(t, n, j_n) = \quad (3)$$
$$\min \left\{ \begin{array}{l} d_w(t, n, j = 0) + g_w(t - M, n - 1, j_{n-1} = 0), \\ d_w(t, n, j = 1) + g_w(t - M, n - 1, j_{n-1} = 1) \end{array} \right\}$$

$$D(w) = \min\{g_w(M(N_w + 1), N_w + 1, Je)/M(N_w + 1), \quad (4)$$
$$..., g_w(T, N_w + 1, Je)/T\}$$

In these equations, n is a Viterbi decoding step, j is a state (j=, 2, ..., J) (J=$2^{K-1}$) and an encoded signal $f_t$(n, j) is generated by a Viterbi decoder corresponding to a Viterbi decoding step n and a state j, where K is a constraint length. That is, the distance $d_w$(t, n, j) is a distance between the received sequence $x_t$ and the encoded signal $f_t$(n, j). Further, $j_{n-1}$, indicates two possible branches from previous states at step n–1 to the state $j_n$ at step n (therefore $j_{n-1}$=0 or 1). It should be noted that n=0 and n=$N_w$+1 are a provisional step for calculation. Assuming that the state j at n=0 is $J_{sw}$, the state j at n=$N_w$+1 is $J_e$, and further the distance $d_w$(t, n=0, j=$J_s$) and the distance $d_w$(t, n=$N_w$+1, ij=$J_e$) are both zero.

Therefore, the alignment time function n(t) is obtained by using a sampling time instant $t_o$ corresponding to D(w) in the equation (4) as follows:

$$n(t) = \begin{cases} Nw + 1 & t_0 < t \\ \frac{1}{M}(t - t_o) + N_w + 1 & t_0 - M(Nw + 1) \leq t \leq t_0 \\ 0 & t < t_0 - M(Nw + 1) \end{cases} \quad (5)$$

The synchronized decoded sequence can be obtained by backtracking states providing min. $\{g_w(t_o-pM, N_w+1-p, J_{NW}=0), g_w(t_o-pM, N_w+1-p, J_{NW}=1)\}$, where p=0, 1, 2, ... Such a backtracking step is known in Viterbi decoding.

DETAILED DESCRIPTION OF THE PREFERRED EMBODIMENT

Figure 1:
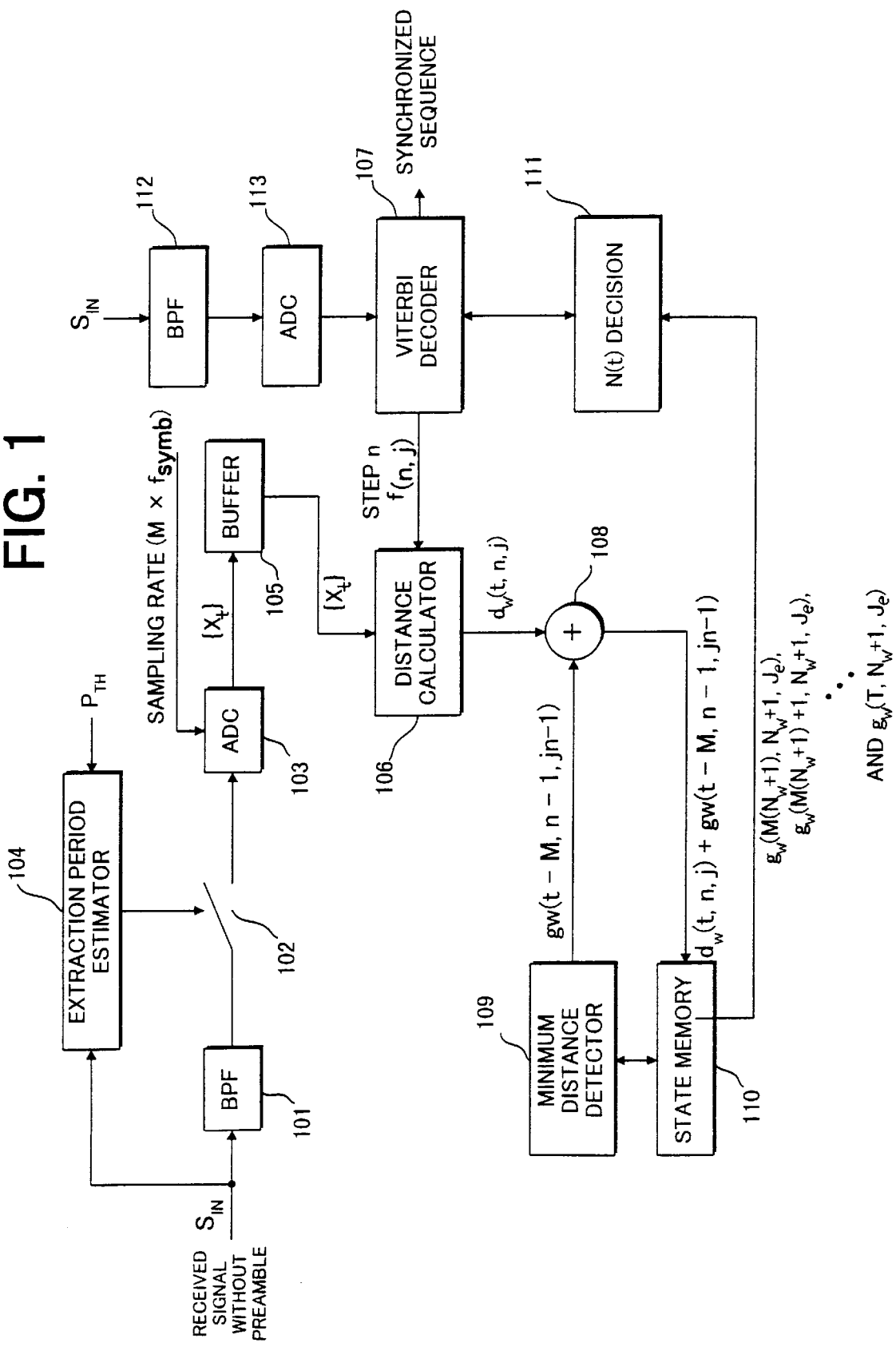
FIG. 1 is a block diagram showing the functional configuration of a demodulator using a Viterbi decoder according to an embodiment of the present invention.

Referring to FIG. 1, there is shown a digital demodulator including a synchronization controller (distance calculator, minimum distance detector, state memory, and N(t) decision)and a Viterbi decoder according to an embodiment of the present invention, which produces a synchronized decoded sequence from a received preambleless signal $S_{IN}$ which does not have a preamble such as a training signal or a sync word. However, the received preambleless signal $S_{IN}$ includes at least a signal which is encoded by a convolutional code having a constraint length of K.

An input section of the digital demodulator is comprised of a band-pass filter 101, an extractor 102, an analog-to-digital converter (ADC) 103, and an extraction period estimator 104. The band-pass filter 101 is set to a predetermined bandwidth which is M times the symbol rate $f_{symb}$, where $M \geq 1$. The extraction period estimator 104 receives the received signal $S_{IN}$ and compares the power level of the received signal $S_{IN}$ with a predetermined level $P_{TH}$ to control the extractor 102 according to the comparison result. When the received power level is not lower than the predetermined level $P_{TH}$, the extractor 102 is closed to transfer the received signal to the ADC 103. When it is lower, the extractor 102 is opened and thereby the received signal is not supplied to the ADC 103.

After the received signal $S_{IN}$ is limited to the predetermined bandwidth by the band-pass filter 101 and is extracted by the extractor 102, it is converted into a digital signal $x_t$ (t=1, 2, ..., T) by the ADC 103 according to a sampling rate $f_{samp}$ which is M times the symbol rate $f_{symb}$. Here, t is the index of a sampling instant and T is the number of sampling instants during al extracted period by the extractor 102. The digital signal $x_t$ is stored onto a buffer memory 105.

Subsequently, the digital signal $x_t$ is output to a distance calculator 106 where a distance $d_w$ is calculated by using the following equation:

$$d_w(t,n,j) = \|f_t(n,j) - x_t\|^2 \qquad (6),$$

where n is a Viterbi decoding step received from a Viterbi decoder 107, j is a state (j=1, 2, ..., J) ($J = 2^{K-1}$), and $f_t(n, j)$ is an encoded signal generated by the Viterbi decoder 107 corresponding to a Viterbi decoding step n and a state j. That is, the distance $d_w(t, n, j)$ indicates an error between the received signal $x_t$ and the generated signal $f_t(n, j)$.

The distance $d_w(t, n, j)$ is added to the output of a minimum distance detector 109 (selector) by an adder 108 and then the output of the adder 108 is stored onto a state memory 110 (accumulator). The minimum distance detector 109 (selector) detects one which is smaller from cumulative distances $\{d_w(t, n, j=0) + g_w(t-M, n-1, j_{n-1}=0)\}$ and $\{d_w(t, n, j=1) + g_w(t-M, n-1, j_{n-1}=1)\}$ which are received from the state memory 110 (accumulator), that is, $$g_w(t, n, j_n) = \qquad (7)$$
$$\min \begin{cases} d_w(t, n, j = 0) + g_w(t - M, n - 1, j_{n-1} = 0), \\ d_w(t, n, j = 1) + g_w(t - M, n - 1, j_{n-1} = 1) \end{cases}$$

where $j_{n-1}$ indicates two possible branches from previous states at step n−1 to the state $j_n$ at step n, therefore $j_{n-1}=0$ or 1. And then the detected one $g_w(t, n, j_n)$ is output to the adder 108.

The state memory 110 stores a step n at a sampling index t, a selected previous state $j_{n-1}$, and cumulative distances $\{d_w(t, n, j=0) + g_w(t-M, n-1, j_{n-1}=0)\}$ and $\{d_w(t, n, j=1) + g_w(t-M, n-1, j_{n-1}=1)\}$ from the adder 108.

The above calculations (6) and (7) are performed for each step n (=0, 1, 2, ..., $N_w$+1) and for each state j (=1, 2, ..., J), where $N_w$ is a length of transmitted sequence. It should be noted that n=0 and n=$N_w$+1 are a provisional step for calculation and that the state j at n=0 is $J_s$, the state j at n=$N_w$+1 is $J_e$, and further the distance $d_w(t, n=0, j=J_s)$ and the distance $d_w(t, n=N_w+1, j=J_e)$ are both zero.

When the calculations (6) and (7) are completed for all steps n (=0, 1, 2, ..., $N_w$+1) and for all states j (=1, 2, ..., J), a resultant cumulative distance $g_w(M(N_w+1), N_w+1, J_e)$ is stored in the state memory 110 (accumulator). In this manner, the following resultant cumulative distances $g_w(M(N_w+1)+1, N_w+1, J_e), g_w(M(N_w+1)+2, N_w+1, J_e), ..., g_w(T, N_w-1, J_e)$ corresponding to sampling instants $M(N_w+1)+1, ..., T$, respectively, are sequentially obtained and stored in the state memory 110 (accumulator). The resultant cumulative distances $g_w(M(N_w+1), N_w+1, J_e)$, $g_w(M(N_w+1)+1, N_w+1, J_e), ..., g_w(T, N_w+1, J_e)$ obtained are output to a mapping decision section 111, which determines the time alignment function n(t) as will be described hereinafter.

The mapping decision section 111 (synchronizer) calculates $g_w(M(N_w+1), N_w+1, J_e)/M(N_w+1), g_w(M(N_w+1)+1, N_w+1, J_e)/(M(N_w+1)+1), ..., g_w(T, N_w+1, J_e)/T$ corresponding to the sampling instants $M(N_w+1), M(N_w+1)+1, ..., T$, respectively. And the mapping decision section 111 (synchronizer) selects a minimum one from them to determine a sampling instant $t_o$ at which the minimum one is obtained. When the sampling instant $t_o$ is determined, the mapping decision section 111 (synchronizer) determines the time alignment function n(t) by using the following equation:

$$n(t) = \begin{cases} Nw + 1 & t_0 < t \\ \dfrac{1}{M}(t - t_o) + N_w + 1 & t_0 - M(Nw + 1) \leq t \leq t_0 \\ 0 & t < t_0 - M(Nw + 1) \end{cases} \qquad (8)$$

Further, the mapping decision section 111 (synchronizer) outputs the time alignment function n(t) to the Viterbi decoder 107 which produces the synchronized decoded sequence by backtracking a selected survivor path corresponding min $\{g_w(t_o-pM, N_w+1-p, J_{NW}=0), g_w(t_o-pM, N_w+1-p, J_{NW}=1)\}$, where p=0, 1, 2, ... The Viterbi decoder 107 performs the well-known decoding process using a digital received signal which is obtained from the received signal $S_{IN}$ by a band-pass filter 112 and an ADC 113.

The distance calculator 106, the adder 108, the minimum distance detector (selector), the mapping decision section 111 (synchronizer) and the Viterbi decoder 107 may be formed with a program-controlled processor such as DSP.

More specifically, the details of an operation when M=2 will be described referring to FIG. 2. Needless to say, the higher the sampling rate of the ADC 103, the higher the precision of bit synchronization.

Figure 2:
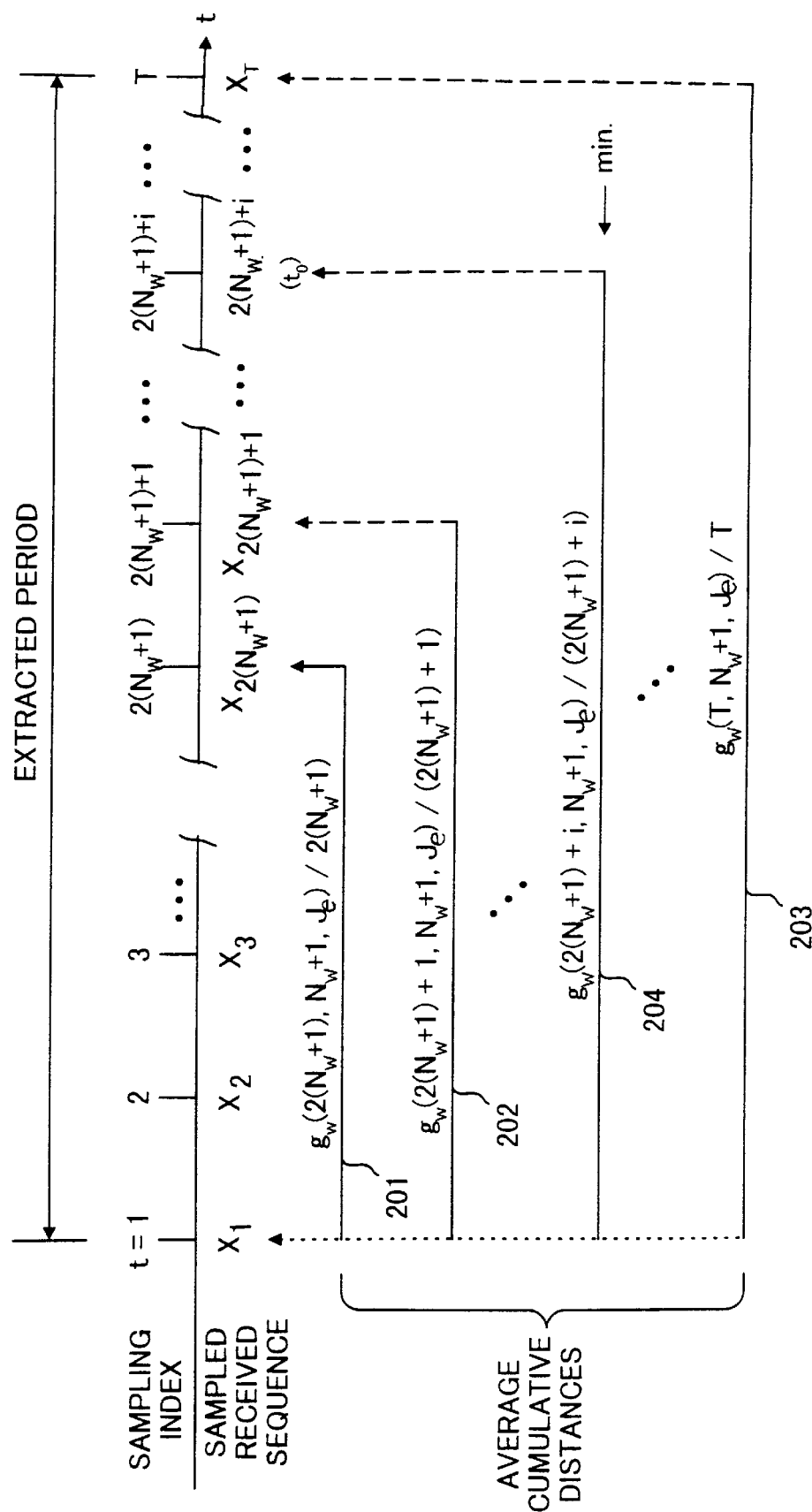
FIG. 2 is a time chart showing an operation of the embodiment as shown in FIG. 1.
Figure 3:
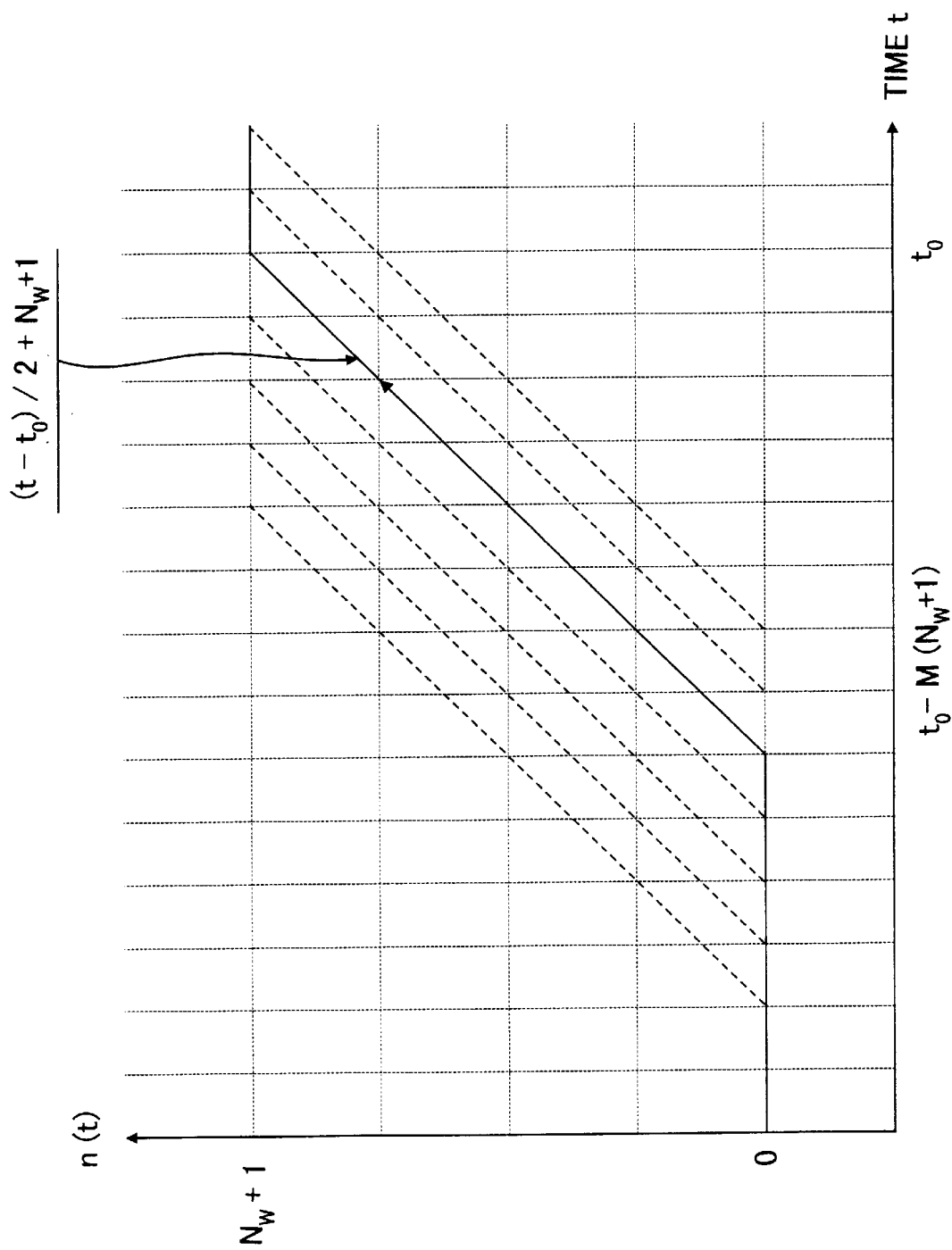
FIG. 3 is a graph showing the selected time alignment function n(t) in the embodiment.

As shown in FIG. 2, assuming that a received sequence $\{x_1, x_2, ..., x_T\}$ during an extracted period is stored in the buffer memory 105. In this case, the equations (6) and (7) are calculated during a period 201 from the sampling instant t=1 to $2(N_w+1)$ to produce the resultant cumulative distance $g_w(2(N_w+1), N_w+1, J_e)$ which is stored in the state memory 110 (accumulator). Similarly, at the end of a period 202 from the sampling instant t=1 to $2(N_w+1)+1$, the subsequent resultant cumulative distance $g_w(2(N_w+1)+1, N_w+1, J_e)$ is produced. In this way, the following resultant cumulative distances are produced, and finally, at the end of a period 203 from the sampling instant t=1 to T, the resultant cumulative distances $g_w(T, N_w+1, J_e)$. These resultant cumulative distances $g_w(2(N_w+1), N_w+1, J_e), g_w(2(N_w+1)+1, N_w+1, J_e), ..., g_w(T, N_w+1, J_e)$ are used to determine the time alignment function n(t) by the mapping decision section 111 using the equation (8), as shown in FIG. 3.

The mapping decision section 111 (synchronizer) calculates average cumulative distances: $g_w(2(N_w+1), N_w+1, J_e)/2(N_w+1), g_w(2(N_w+1)+1, N_w+1, J_e)/(2(N_w+1)+1), \ldots, g_w(T, N_w+1, J_e)/T$, and then searches for a minimum one, here $g_w(2(N_w+1)+i, N_w+1, J_e)/(2(N_w+1)+i)$. Since they correspond to the sampling instants $2(N_w+1), 2(N_w+1)+1, \ldots, T$, respectively, the minimum one $g_w(2(N_w+1)+i, N_w+1, J_e)/(2(N_w+1)+i)$ indicates the sampling instant $t_o=2(N_w+1)+i$ at which the distance between the received sequence and the generated convolutional code becomes shortest. In other words, the sampling instant $t_o=2(N_w+1)+i$ represents the location of the Viterbi-decoded sequence in the received sequence. Using the sampling instant $t_o=2(N_w+1)+i$, the mapping decision section 111 determines the time alignment function n(t) which is used by the viterbi decoder 107 to produce synchronized sequence as described before.

What is claimed is:

1. A method for generating an output sequence from a received preambleless signal which does not include a signal for synchronization but includes a signal encoded by a convolutional code, the method comprising the steps of:
   a) converting the received preambleless signal to a received sequence at a sampling rate which is at least a predetermined symbol rate; and
   b) synchronizing a Viterbi decoder with the received sequence and decoding the received preambleless signal after bandpass filtering and an analog to digital conversion with the decoder synchronized by the received sequence to produce a Viterbi-decoded sequence as the output sequence while determining a time mapping so that the Viterbi-decoded sequence is closest to the received sequence, said step of synchronizing comprising:
       generating the output sequence w and the time mapping n(t) so as to minimize a cumulative distance D(w) represented by the following equation (1):

$$D(w) = \sum_{t=1}^{T} \|x_t - f(w, n(t))\|^2 \tag{1}$$

where t is a sampling index of the received sequence, T is the number of sampling points during the time period of the received signal, $x_t$ is the received sequence, f(w,n(t)) is an encoded signal generated from the output sequence w.

2. The method according to claim 1, wherein the step b) comprises:
   determining a time alignment function so that the Viterbi-decoded sequence is closest to the received sequence, the alignment function indicating where the Viterbi-decoded sequence is located in the received sequence; and
   synchronizing the Viterbi-decoded sequence depending on the time alignment function to produce the output sequence.

3. The method according to claim 1, wherein the step b) comprises:
   producing a distance between the received sequence and each of all possible Viterbi-decoded sequences;
   cumulating the distance in sampling points of the received sequence over a time period of the received sequence to produce a plurality of cumulative distances;
   determining the time mapping by selecting a minimum cumulative distance from the cumulative distances; and
   synchronizing the Viterbi-decoded sequence with the received sequence to produce the output sequence depending on the time mapping.

4. The method according to claim 3, wherein the step b) comprises the steps of:
   performing the following equations (2) and (3) over the time period of the received signal; and
   performing the following equation (4):

$$d_w(t, n, j) = \| f_t(n, j) - x_t \|^2 \tag{2}$$

$$g_w(t, n, j_n) = \tag{3}$$
$$\min\left\{ \begin{array}{l} d_w(t, n, j = 0) + g_w(t - M, n - 1, j_{n-1} = 0), \\ d_w(t, n, j = 1) + g_w(t - M, n - 1, j_{n-1} = 1) \end{array} \right\}$$

$$D(w) = \min\{g_w(M(N_w + 1), N_w + 1, Je)/M(N_w + 1), \tag{4}$$
$$\ldots, g_w(T, N_w + 1, Je)/T\}$$

where, n is a Viterbi decoding step, j is a state (j=1, 2, ..., J) ($J=2^{K-1}$), and an encoded signal $f_t(n,j)$ is generated by the Viterbi decoder corresponding to a Viterbi decoding step n and a state j, where K is a constraint length, $j_{n-1}$ indicates two possible branches from previous states at step n-1 to the state in at step n, n=0 and n=$N_w$+1 are a provisional step for calculation, and $J_e$ is a state j at n=$N_w$+1, and further the distance $d_w(t, n=0, j==J_s)$ and the distance $d_w(t, n=N_w+1, j=J_e)$ are both zero.

5. The method according to claim 4, further comprising the step of:
   determining a sampling time index to corresponding to D(w) in the equation (4), and
   performing the following equation (5):

$$n(t) = \begin{cases} Nw + 1 & t_o < t \\ \dfrac{1}{M}(t - t_o) + N_w + 1 & t_o - M(Nw + 1) \leq t \leq t_o \\ 0 & t < t_o - M(Nw + 1) \end{cases} \tag{5}$$

6. A demodulator for demodulating a received preambleless signal which does not include a signal for synchronization but is encoded by a convolutional code to produce an output sequence, the demodulator comprising:
   a Viterbi decoder decoding the received preambleless signal after bandpass filtering and analog to digital conversion to produce a Viterbi-decoded sequence;
   converter converting the received preambleless signal to a received sequence at a sampling rate which is at least a predetermined symbol rate; and
   a sync controller synchronizing the Viterbi decoder with the received sequence to produce the output sequence while determining a time mapping so that the Viterbi-decoded sequence is closest to the received sequence, said sync controller generating the output sequence w and the time mapping n(t) so as to minimize a cumulative distance D(w) represented by the following equation (1):

$$D(w) = \sum_{t=1}^{T} \|x_t - f(w, n(t))\|^2 \tag{1}$$

where t is a sampling index of the received sequence, T is the number of sampling points during a time period of the received signal, $x_t$ is the received sequence, f(w, n(t)) is an encoded signal generated from the output sequence w.

7. The demodulator according to claim 6, wherein the sync controller determines a time alignment function so that the Viterbi-decoded sequence is closest to the received sequence, the alignment function indicating where the Viterbi-decoded sequence is located in the received sequence, and synchronizes the Viterbi-decoded sequence depending on the time alignment function to produce the output sequence.

8. The demodulator according to claim 6, wherein the sync controller comprises:

a distance calculator producing a distance between the received sequence and each of all possible Viterbi-decoded sequences;

an accumulator cumulating the distance in sampling points of the received sequence over a time period of the received sequence to produce a plurality of cumulative distances;

a selector selecting a minimum cumulative distance from the cumulative distances to determine the time mapping; and a synchronizer synchronizing the Viterbi-decoded sequence with the received sequence to produce the output sequence depending on the time mapping.

9. The demodulator according to claim 6, wherein the sync controller performs the following equation (2) and (3) over the time period of the received signal, and then performs the following equation (4):

$$d_w(t, n, j_n) = \| f_t(n, j) - x_t \|^2 \quad (2)$$

$$g_w(t, n, j_n) = \min\begin{cases} d_w(t, n, j=0) + g_w(t-M, n-1, j_{n-1}=0), \\ d_w(t, n, j=1) + g_w(t-M, n-1, j_{n-1}=1) \end{cases} \quad (3)$$

$$D(w) = \min\{g_w(M(N_w+1), N_w+1, Je)/M(N_w+1), \quad (4)$$
$$\ldots, g_w(T, N_w+1, Je)/T\}$$

where, n is a Viterbi decoding step, j is a state (j-1, 2, ..., J) ($J-2^{K-1}$), and an encoded signal ft(n, j) is generated by the Viterbi decoder corresponding to a Viterbi decoding step n and a state j, where K is constraint length, $j_{n-1}$ indicates two possible branches from previous states at step n-1 to the state $j_n$ at step n, n=0 and n=$N_w$+1 are a provision step for calculation, and $J_e$ is a state j at n=$N_w$+1, and further the distance $d_w(t, n=0, j=J_s)$ and the distance $d_w(t, n=N_w+1, j=J_e)$ are both zero.

10. The demodulator according to claim 9, wherein the sync controller determines a sampling time index to corresponding to D(w) in the equation (4), and then performs the following equation (5)

$$n(t) = \begin{cases} Nw+1 & t_o < t \\ \frac{1}{M}(t-t_o) + N_w + 1 & t_o - M(Nw+1) \leq t \leq t_o \\ 0 & t < t_o - M(Nw+1) \end{cases} \quad (5)$$

11. The demodulator according to claim 6, further comprising:

a band-pass filter passing a baseband signal having a bandwidth of the sampling rate; and an input extractor extracting the received signal from the baseband signal passing through the band-pass filter when a signal level of the baseband signal is greater than a predetermined level, the received signal being transferred to the converter.

12. The demodulator according to claim 8, wherein the distance calculator produces the distance between the received sequence and each of all possible Viterbi-decoded sequences which are generated using a Viterbi-decoding step.

13. A method for demodulating a received preambleless signal which does not include a signal for synchronization but comprises a signal encoded by a convolutional code to produce an output sequence, the method comprising the steps of:

a) converting the received preambleless signal to a received sequence at a sampling rate which is at least a predetermined symbol rate;

b) decoding the received preambleless signal, after band-pass filtering and analog to digital conversion, into a Viterbi-decoded sequence at the predetermined symbol rate; and c) synchronizing the Viterbi-decoded sequence with the received sequence to produce the output sequence while determining a time mapping so that the Viterbi-decoded sequence is closest to the received sequence, said step of synchronizing comprising generating the output sequence w and the time mapping n(t) so as to minimize a cumulative distance D(w) represented by the following equation (1):

$$D(w) = \sum_{t=1}^{T} \| x_t - f(w, n(t)) \|^2 \quad (1)$$

where t is a sampling index of the received sequence, T is the number of sampling points during a time period of the received signal, $x_t$ is the received sequence, f(w, n(t)) is an encoded signal generated from the output sequence w.

14. The method according to claim 13, wherein the step c) comprises:

determining a time alignment function so that the Viterbi-decoded sequence is closest to the received sequence, the alignment function indicating where the Viterbi-decoded sequence is located in the received sequence; and synchronizing the Viterbi-decoded sequence depending on the time alignment function to produce the output sequence.

15. The method according to claim 13, wherein the step c) comprises:

producing a distance between the received sequence and each of all possible Viterbi-decoded sequences;

cumulating the distance in sampling points of the received sequence over a time period of the received sequence to produce a plurality of cumulative distances;

determining the time mapping by selecting a minimum cumulative distance from the cumulative distances; and synchronizing the Viterbi-decoded sequence with the received sequence to produce the output sequence depending on the time mapping.

* * * * *